United States Patent

Kobayashi et al.

[11] Patent Number: 5,475,440
[45] Date of Patent: Dec. 12, 1995

[54] DIGITAL TIME BASE CORRECTOR FOR VIDEO SIGNAL REPRODUCTION

[75] Inventors: Tadayoshi Kobayashi, Koufu; Masahiro Nakajima, Tokorozawa, both of Japan

[73] Assignees: Pioneer Electric Corporation, Tokyo; Pioneer Video Corporation, Yamanashi, both of Japan

[21] Appl. No.: 135,997

[22] Filed: Oct. 14, 1993

[30] Foreign Application Priority Data

Oct. 16, 1992 [JP] Japan ............... 4-278837

[51] Int. Cl.⁶ ............... H04N 9/896; H04N 9/89
[52] U.S. Cl. ............... 348/498; 348/497; 348/537; 348/536; 348/540; 348/549; 358/326
[58] Field of Search ............... 348/498, 499, 348/497, 508, 506, 505, 518, 512, 519, 536, 537, 540, 549, 541, 500, 651, 654, 649; 358/326, 325, 324, 320, 319, 314; 360/36.1, 36.2, 37.1, 38.1; H04N 9/896, 9/88, 9/87, 9/66, 9/77, 9/79, 9/89

[56] References Cited

U.S. PATENT DOCUMENTS

| | | | |
|---|---|---|---|
| 4,054,903 | 10/1977 | Ninomiya | 348/498 |
| 4,339,770 | 7/1982 | Dennison et al. | 348/498 |
| 4,714,954 | 12/1987 | Yoshinaka et al. | 348/498 |
| 4,736,238 | 4/1988 | Moriyama et al. | 348/505 X |
| 5,142,377 | 8/1992 | Moriyama et al. | 348/497 X |

*Primary Examiner*—Safet Metjahic
*Attorney, Agent, or Firm*—Fish & Richardson

[57] ABSTRACT

A digital time base corrector which can perfectly eliminate residual errors. A sync clock signal whose phase is synchronized with a time base fluctuation included in a reproduction video signal is formed in accordance with at least one of the horizontal sync signal and the color burst signal which are separated from a reproduction video signal. The sync clock signal is phase-modulated in accordance with a burst error signal indicative of the time base fluctuation of the color burst signal in a period of time other than the generating period of time of at least the color burst signal in the reproduction video signal, thereby obtaining a write clock signal of the image memory.

2 Claims, 1 Drawing Sheet

5,475,440

DIGITAL TIME BASE CORRECTOR FOR VIDEO SIGNAL REPRODUCTION

BACKGROUND OF THE INVENTION

1. Field of the Invention

The invention relates to a digital time base corrector in an apparatus for reproducing a video signal recorded on a recording medium.

2. Description of Background Information

When a video signal recorded on a video disc is simply demodulated and reproduced, fine jitters are included in the reproduced video signal due to an eccentric component of the video disc and the vibration of the mechanism system. This results in a time base error which causes a deviation of the reproduced video signal from a reference time base. As means for correcting such a time base error, there is known a digital time base corrector such that after the reproduced video signal was converted into the digital data by an A/D converter, it is written into a memory, and the digital data is sequentially read out synchronously with a reference timing signal in accordance with the writing order and is converted to an analog signal by a D/A converter.

As a conventional digital time base corrector, there is a corrector disclosed in Japanese Patent Kokai No. 1-93273. In such a time base corrector, there is provided a phase locked loop (PLL) circuit such that at least one of a horizontal sync signal and a color burst signal is separated and extracted from the reproduced video signal and the separated signal is supplied to the PLL circuit. The PLL circuit produces a clock signal whose phase is synchronized with a time base error included in the reproduced video signal, and the clock signal is phase-modulated by phase modulating means in accordance with a phase comparison output of phase comparing means in the PLL circuit. The clock signal after completion of the phase modulation is used as a sample timing signal of the A/D converter. The clock signal, consequently, also traces the high frequency component of the time base error and the correction is performed.

In such a conventional digital time base corrector, however, when there is a phase comparison output in the phase comparison means, namely, even in a generating period of time of the horizontal sync signal and the color burst signal, the clock signal is phase-modulated in accordance with a phase error of the color burst signal, so that there is a problem such that residual errors cannot be eliminated.

SUMMARY OF THE INVENTION

This invention provides a digital time base corrector which can eliminate a time base error in the generating period of time of a horizontal sync signal and a color burst signal.

A digital time base corrector according to the invention comprises A/D converting means for converting a reproduction video signal which was read out and reproduced from a recording medium into a digital signal; memory control means for writing the digital signal into an image memory in accordance with a write clock signal and for reading out the digital signal from the image memory in accordance with a read-out clock signal of a predetermined writing period; and D/A converting means for converting the read-out digital signal into an analog video signal. The memory control means has clock forming means for forming a sync clock signal whose phase is synchronized with a time base fluctuation included in the reproduction video signal in accordance with at least one of a horizontal sync signal and a color burst signal which are separated from the reproduction video signal and modulating means for obtaining the write clock signal by phase modulating the sync clock signal in accordance with a burst error signal indicative of the time base fluctuation of the color burst signal in a period of time other than the generating period of time of at least the color burst signal in the reproduction video signal.

In the digital time base corrector according to the invention, the sync clock signal whose phase is synchronized with the time base fluctuation included in the reproduction video signal is formed in accordance with at least one of the horizontal sync signal and the color burst signal which are separated from the reproduction video signal, and the sync clock signal is phase-modulated in accordance with the burst error signal indicative of the time base fluctuation of the color burst signal in a period of time other than the generating period of time of at least the color burst signal in the reproduction video signal, thereby obtaining the write clock signal of the image memory.

DETAILED DESCRIPTION OF THE INVENTION

Figure 1:
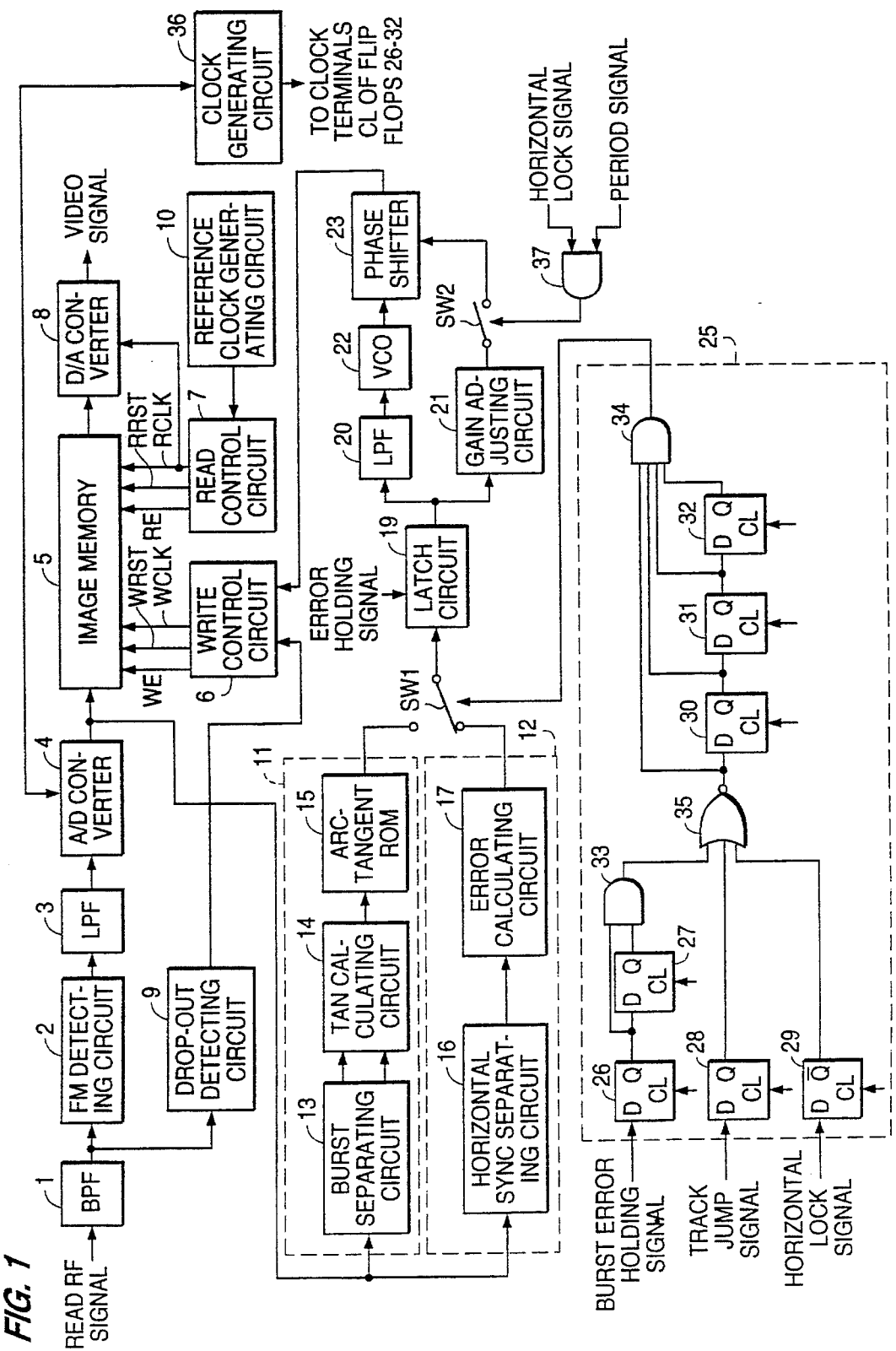
FIG. 1 is a block diagram showing an embodiment of the invention.

An embodiment of the invention will be described in detail hereinafter with reference to the drawing.

In a digital time base corrector according to the invention shown in FIG. 1, a read RF signal generated from a pickup (not shown) of a video disc player is supplied to a BPF (band pass filter) 1, by which only a video signal band component is derived and supplied to an FM detecting circuit 2. The video signal demodulated by the FM detecting circuit 2 is supplied to an A/D converter 4 through an LPF (low pass filter) 3. An image memory 5 is provided for a conversion output of the A/D converter 4. The image memory 5 comprises an FIFO (First In First Out) memory and has a capacity to store the video signal of 2H (H represents a horizontal scanning period). The writing operation of data into the image memory 5 is controlled by a write control circuit 6. A write enable signal WE, a write reset signal WRST, and a write clock signal WCLK are supplied from the write control circuit 6 to the image memory 5. The write enable signal WE, a write reset signal WRST, and a write clock signal WCLK are supplied from the write control circuit 6 to the image memory 5. The write clock signal WCLK is also supplied as a sampling pulse to the A/D converter 4. The reading operation of data from the image memory 5 is controlled by a read control circuit 7O A read enable signal RE, a read reset signal RRST, and a read clock signal RCLK are supplied from the read control circuit 7 to the image memory 5. A reference clock generating circuit 10 is connected to the read control circuit 7. The read clock signal RCLK is generated in response to the reference clock signal, so that the reading operation is executed. The data read out from the image memory 5 is supplied to a D/A converter 8. The D/A converter 8 converts the read-out data into the analog video signal in response to the read clock signal RCLK.

A drop-out detecting circuit 9 to detect a signal drop-out is connected to an output terminal of the BPF 1. A detection output of the drop-out detecting circuit 9 is supplied to the write control circuit 6. The write control circuit 6 has a logic circuit as means for inhibiting the writing operation into the image memory. The logic circuit sets the write enable signal WE to the high level indicative of the inhibition of the writing operation synchronously with the write clock signal WCLK in accordance with the generation of the drop-out detection signal of the drop-out detecting circuit 9 and to set the write enable signal WE to the low level indicative of the permission of the writing operation synchronously with the write clock signal WCLK in accordance with the extinction of the drop-out detection signal.

A burst error forming circuit 11 and a horizontal sync error forming circuit 12 are connected to the conversion output of the A/D converter 4. The burst error forming circuit 11 has a burst separating circuit 13 for generating a color burst signal component in the digital video signal supplied from the A/D converter 4 as an SIN (sine) component signal and a COS (cosine) component signal. The SIN component signal and COS component signal are supplied to a TAN (tangent) calculating circuit 14, by which a TAN component signal is calculated by dividing the SIN component signal by the COS component signal. An arctangent ROM 15 is connected to an output of the TAN calculating circuit 14. An angle component as a burst error signal from the TAN component signal is generated using a predetermined table in the ROM 15. The horizontal sync error forming circuit 12 has a horizontal sync separating circuit 16 to separate and extract a horizontal sync signal component in the digital video signal supplied from the A/D converter 4. From the separated and extracted horizontal sync signal component, a horizontal sync error signal is calculated by an error calculating circuit 17 including a loop circuit by a PLL.

A change-over switch SW1 is connected to each output of the burst error forming circuit 11 and the horizontal sync error forming circuit 12. The switch SW1 selectively relays either one of the burst error signal and the horizontal sync error signal to a latch circuit 19 in accordance with a switching signal from a switching control circuit 25, which will be explained later. An LPF 20 and a gain adjusting circuit 21 are connected to the latch circuit 19. An error signal held in the latch circuit 19 is supplied to the LPF 20 and the gain adjusting circuit 21. An output signal of the LPF 20 is supplied to a VCO 22 and controls a frequency of an oscillation signal of the VCO 22. A phase shifter 23 is connected to an output of the VCO 22. An output signal of the gain adjusting circuit 21 is supplied to the phase shifter 23 through a switch SW2. When the switch SW2 is on, the phase shifter 23 controls the phase of the oscillation signal in accordance with an output signal level of the gain adjusting circuit 21. An output signal of the phase shifter 23 is supplied to the write control circuit 6.

The switching control circuit 25 is made up of seven D-type flip-flops 26 to 32, AND circuits 33 and 34, and an NOR circuit 35. That is, a burst error holding signal is supplied to a D input terminal of the flip-flop 26. A Q output terminal of the flip-flop 26 is connected to a D input terminal of the flip-flop 27 and to one input terminal of the AND circuit 33 of two inputs. A Q output terminal of the flip-flop 27 is connected to another input terminal of the AND circuit 33. A track jump signal is supplied from a tracking servo system to a D input terminal of the flip-flop 28. A horizontal lock signal which is obtained from the loop circuit in the error calculating circuit 17 is supplied to a D input terminal of the flip-flop 29. The horizontal lock signal indicates that the PLL loop circuit to form the horizontal sync error signal is locked.

The NOR circuit 35 gets the NOT-OR of the outputs of the AND circuit 33 and the flip-flops 28 and 29. The three flip-flops 30 to 32 are serially connected to an output terminal of the NOR circuit 35. The AND circuit 34 gets the AND of the outputs of the NOR circuit 35 and flip-flops 30 to 32. An output signal of the AND circuit 34 is supplied as a switching signal to the switch SW1. A 1H clock signal of an 1H interval is supplied from a clock generating circuit 36 to each clock terminal CL of the flip-flops 26 to 32 in accordance with the write clock signal WCLK.

The switch SW2 is turned on or off in accordance with an output signal level of an AND circuit 37. A horizontal lock signal and a period signal indicative of a period of time of at least the color burst signal of the reproduction video signal are supplied to the AND circuit 37. When the horizontal loop circuit is in a locking state and lies within a burst signal period of time or a horizontal sync signal period of time, the AND circuit 37 is set to the high level to turn off the switch SW2.

In such a construction, the video signal demodulated by the FM detecting circuit 2 is supplied to the A/D converter 4 through the LPF 3. The video data as a digital video signal is supplied from the A/D converter 4 to the image memory 5. In the image memory 5, when the write enable signal WE from the write control circuit 6 is at the low level indicative of the permission of the writing operation, write addresses are sequentially designated in accordance with the write clock signal WCLK and the video data of one pixel is written into such addresses. For example, the video data of 910 pixels per 1H is written. When the read enable signal RE from the read control circuit 7 is at the low level indicative of the permission of the reading operation, as for the video data written in the image memory 5, read addresses are sequentially designated in accordance with the read clock signal RCLK with a time delay of about 2H from the writing operation and the video data of one pixel is read out from such addresses. The read-out video data is converted into the analog video signal by the D/A converter 8.

When the drop-out detecting circuit 9 detects a signal drop-out from the demodulated video signal, the drop-out detection signal is supplied from the drop-out detecting circuit 9 to the write control circuit 6. The write enable signal WE is set to the high level indicative of the inhibition of the writing operation. No video data is written into the image memory 5. The written video data is held.

The video data generated from the A/D converter 4 is supplied to the burst error forming circuit 11 and the horizontal sync error forming circuit 12. In the burst error forming circuit 11, the color burst signal component in the video data is generated from the burst separating circuit 13 as a sine (SIN) component signal and a cosine (COS) component signal. The SIN component signal and COS component signal are set to the TAN calculating circuit 14, by which a tangent (TAN) component signal is derived by the calculation of the SIN component/COS component. A burst error signal indicative of an arctangent is generated from the ROM 15 in correspondence to a TAN component signal. On the other hand, in the horizontal sync error forming circuit 12, the horizontal sync signal component in the video data is separated by the horizontal sync separating circuit 16 and is generated therefrom. In accordance with the horizontal sync signal component, the horizontal sync error signal is calculated by the error calculating circuit 17.

Either one of the error signals generated from the burst error forming circuit 11 and the horizontal sync error forming circuit 12 is supplied to the latch circuit 19 through the switch SW1. When the error holding signal is at the low level, the error signal is directly supplied from the latch circuit 19 to the VCO 22 through the LPF 20. Therefore, the oscillation signal is sent from the VCO 22 to the phase shifter 23 at a frequency according to the error signal.

The level of the error signal generated from the latch circuit 19 is adjusted by the gain adjusting circuit 21. After that, where the switch SW2 is on, the level adjusted error signal is supplied to the phase shifter 23 through the switch SW2.

When the horizontal sync error signal or the burst error signal should be held, the error holding signal is set to the high level. When there is no need to hold the horizontal sync error signal or the burst error signal, the error holding signal is set to the low level. The track jump signal is set to the high level in a state in which the tracking servo loop is open. The track jump signal is set to the low level when the tracking servo loop is closed. When the horizontal loop circuit in the error calculating circuit 17 is in a locking state, the horizontal lock signal is set to the high level. When it is in an unlocking state, the horizontal lock signal is set to the low level. When the 1H clock signal is supplied to the D-type flip-flops 26 to 32, the input level of the input terminal D is transmitted to a Q output terminal, so that the outputs of the flip-flops 26, 28, and 29 correspond to the new input level every 1H period of timer.

The flip-flop 27 and the AND circuit 33 detect a period of time during which the burst error holding signal is at the high level for 2H. In this instance, the AND circuit 33 generates a high level output. Since the NOR circuit 35 gets the NOT-OR of the outputs of the AND circuit 33 and the flip-flops 28 and 29, there is no need to hold the burst error signal. When conditions such that the burst error holding signal is at the low level and the tracking servo loop is in a closed state and the track jump signal is at the low level and, further, the horizontal loop circuit is in a locking state and the horizontal lock signal is at the high level are satisfied, the output level of the NOR circuit 35 is sent to the high level. The output signal of the NOR circuit 35 is first supplied to the flip-flop 30 and is set to the flip-flop 31 after 1H and is supplied to the flip-flop 32 further after 1H.

Therefore, when the above conditions continue for 3H or longer, the output level of the AND circuit 34 is set to the high level and is supplied to the switch SW1. When the output level of the AND circuit 34 is at the low level, the switch SW1 is set into a selecting state of the output side of the horizontal sync error forming circuit 12. When the output level of the AND circuit 34 is at the high level, the switch SW1 is set to a selecting state on the output side of the burst error forming circuit 11. When the horizontal loop circuit is in the locking state and the horizontal lock signal is at the high level and the period signal is at the high level for the generating period of time of the color burst signal and the horizontal sync signal of the reproduction video signal, the output level of the AND circuit 37 is set to the high level, so that the switch SW2 is turned off. In the other cases, the switch SW2 is turned on.

When the output level of the AND circuit 34 is at the low level and the switching conditions of the switch SW1 are not satisfied, the horizontal sync error signal is relayed by the switch SW1. Therefore, the frequency of the oscillation signal of the VCO 22 is set to a value in accordance with the horizontal sync error signal. The oscillation signal is supplied to the write control circuit 6 through the phase shifter 23, thereby deciding the generating timing of the write clock signal WCLK. In this instance, when the horizontal loop circuit is in a locking state and lies within the burst signal period of time or horizontal sync signal period of time, the switch SW2 is turned off, so that the phase of the oscillation signal is unchanged without being shifted by the phase shifter 23. When the horizontal loop circuit is in an unlocking state or doesn't lie within both of the burst signal period of time and the horizontal sync signal period of time, the switch SW2 is turned on, so that the phase of the oscillation signal is shifted by the phase shifter 23 in accordance with the gain-adjusted horizontal sync error signal, thereby executing the phase modulation.

When there is no need to hold the burst error signal and a state in which the tracking servo loop is in a closed state and, further, the horizontal loop circuit is in a locking state continues for a time interval of 3H or longer, the switching conditions of the switch SW1 are satisfied and the switch SW1 is switched to the selecting state of the output side of the burst error forming circuit 11 in accordance with the high level output of the AND circuit 34. Since the burst error signal is relayed by the switch SW1, the frequency of the oscillation signal of the VCO 22 is set to a value according to the burst error signal. The oscillation signal is supplied to the write control circuit 6 through the phase shifter 23, thereby deciding the generating timing of the write clock signal WCLK. In this instance, when the horizontal loop circuit is in a locking state and lies within the burst signal period of time or the horizontal sync signal period of time, the switch SW2 is turned off, so that the phase of the oscillation signal is unchanged without being shifted by the phase shifter 23. When the horizontal loop circuit lies within none of the burst signal period Of time and the horizontal sync signal period of time, the switch SW2 is turned on, so that the phase of the oscillation signal is shifted by the phase shifter 23 in accordance with the gain adjusted horizontal sync error signal, thereby performing the phase modulation.

The switch SW2 is turned off for both of the burst signal period of time and the horizontal sync signal period of time. This is because a delay of the processes of the LPF 20 as a digital filter or the like is considered. In principle, it is sufficient to turn off the switch SW2 only for the burst signal period of time.

In the digital time,base corrector of the invention as mentioned above, the sync clock signal whose phase is synchronized with the time base fluctuation included in the reproduction video signal is formed and the sync clock signal is phase-modulated in accordance with the burst error signal indicative of the time base fluctuation of the color burst signal for a period of time other than the generating period of time of at least color burst signal in the reproduction video signal, thereby obtaining the write clock signal of the image memory. The time base error, consequently, in the generating period of time of the horizontal sync signal and color burst signal can be eliminated.

What is claimed is:

1. A digital time base corrector comprising:

A/D converting means for converting a reproduced video signal read out and reproduced from a recording medium into a digital signal;

memory control means for writing said digital signal into an image memory in accordance with a write clock signal and for reading out said digital signal from said image memory in accordance with a read clock signal of a predetermined period of time;

D/A converting means for converting said read-out digital signal into an analog video signal, wherein said memory control means comprises clock forming means for forming a sync clock signal having a phase synchronized with a time base fluctuation included in said reproduced video signal in accordance with at least one of a horizontal sync signal and a color burst signal which are separated from said reproduction video signal, and modulating means for obtaining said write clock signal by phase modulation of said sync clock signal in accordance with a burst error signal indicative of a time base fluctuation of said color burst signal in a period of time other than a period in which at least said color burst signal in said reproduced video signal is generated; and switching relay means for selectively relaying one of a burst error signal and a horizontal sync error signal to said clock forming means in accordance with a burst error hold signal and a horizontal lock signal.

2. A digital time base corrector according to claim 1, wherein said switching relay means relays one of the burst error signal and the horizontal sync error signal to said clock forming means in accordance with the burst error hold signal, the horizontal lock signal, and a track jump signal.

* * * * *